Jan. 25, 1955

E. C. BROWN 2,700,760

DETECTOR FOR WORN CARBON INSERTS

Filed April 28, 1951

Inventor
EVERETT C. BROWN

By John L. Milton

Attorney

United States Patent Office 2,700,760
Patented Jan. 25, 1955

2,700,760

DETECTOR FOR WORN CARBON INSERTS

Everett C. Brown, Louisville, Ky., assignor to Cheatham Electric Switching Device Co., Incorporated, Louisville, Ky., a corporation of Kentucky Application April 28, 1951, Serial No. 223,534

7 Claims. (Cl. 340—269)

This invention relates to apparatus for detecting irregularities that may develop through accident to or wear in a trolley current collector that engages a trolley wire for receiving current for propelling a vehicle.

The primary object of my invention is to provide a simple device for detecting the irregularities referred to in the preceding paragraph and activating a signal to indicate any one of the several irregularities that may develop through use or accident.

A further object of this invention is to construct a device of the character referred to above that will be relatively permanent after installation so as to be sufficiently dependable to dispense with the regular inspection of trolley collectors by experts, thereby reducing the expense of the operation of electrically propelled vehicles equipped with trolley shoes especially those having a carbon insert in accordance with current day practice for both track and dirigible vehicles.

These and other objects will be apparent to operators of the stated vehicles as the following description is read in connection with the accompanying drawings, in which.

Figure 1:
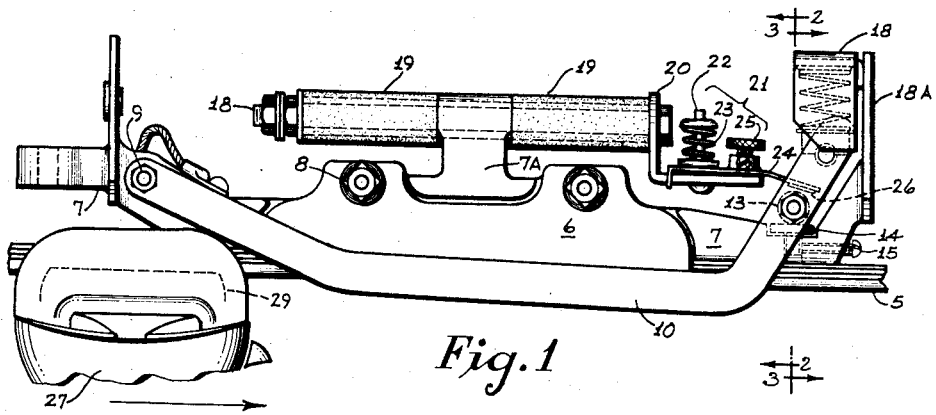
Figure 1 is a side elevation of a preferred form of contactor arranged to control a normally open circuit in which any desired signalling device may be included. This figure shows the contactor mounted on a grooved trolley wire in accordance with current conventional practice.

Numeral 5 designates one of the trolley wires on to which is secured a contact device, of the type disclosed in Patent 2,302,890, by means of the clamp 6 which is secured to spine 7 by means of bolts 8. Pivoted to the spine by means of bolt 9 are swingable runners 10, the free ends of which are tied together by means of bolt 11 that passes through spacers 12, 12 with electrical contact sleeve 13 gripped therebetween. During normal or inactive use, this contact rests on top of the head of stop 14 that is adjustable by means of threads associated with it and the spine and when so adjusted it may be locked in place by set screw 15. Adjacent the tips at the extreme free ends of the runners is a crossbar 15 permanently attached thereto. Straddling this crossbar is a button 16 for receiving one end of spring 17, while the other end of the spring engages the inner top surface of an inverted U-shaped stirrup 18 that is rigidly secured to the extreme right end of the spine by bar 18A. The free arms of this stirrup embrace the outer faces of the ends of the runners in slidable relation since, when the runners are moved upwardly, as explained hereinafter, they will put the spring under additional tension. The main purpose of this spring, and its related parts, is to supply moderate pressure to the runners in order to provide a dampening effect for nullifying vibration caused by a collector traversing a trolley wire, which vibration has been found to give false signals. Numeral 7a designates a vertical projection of the spine and is provided with a hole for receiving bolt 18 that also passes through insulating cylinders 19, 19 and the vertical arm of angular perch 20 while the horizontal arm thereof is equipped with a yielding contact holder designated generally by numeral 21. This contact holder is of conventional form wherein rivet 22 maintains spring 23 under tension for retaining contact leaf 24 in the position illustrated. Screw 25 is threaded into a sleeve as shown affixed with the leaf and is provided for adjusting the contact 26, that is permanently attached to said leaf, for providing the desired gap in relation to contact 13.

Figures 2, 2A:
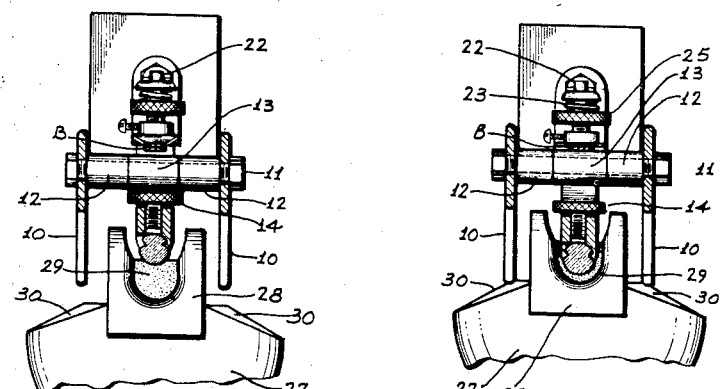
Figure 2 is a vertical section taken along a vertical line at the right hand end of Fig. 1 and designated by arrows and numerals 2, 2.
Figure 2a is identical with Fig. 2, except that it shows the relation of the same parts after appreciable wear of the carbon insert has developed.

Only a fragment 27 of the head of a trolley collector that holds shoe 28 with its carbon insert or block 29 is shown in Figs. 1, 2 and 2a. This type of collector has been developed and generally adopted because this head has proven to have a very long life by reason of the incident wear falling on the shoe and insert which are renewable. The latter may be likened to the sole of shoes worn by humans. It takes the major portion of the wear. This shoe is of a conventional type that is in extensive use on both track and dirigible electrically-propelled vehicles that receive current from an overhead trolley wire. It should be borne in mind that trolley heads, of the type referred to herein, are swiveled in order that the insert will remain in firm contact with the trolley wire it traverses since the vehicle, especially of the dirigible type, sways and turns when under travel. The swivel mounting is effected by means of a substantially vertical shaft depending from the head and journaled at the end of the trolley pole. When this bearing becomes dry, or "frozen," or distorted, the relation of the shoe, insert and head as shown in Fig. 2, even though the insert is intact, will not be preserved. When this condition develops the runner associated therewith, when the collector passes under a contactor, will be raised and the signal operated.

In Fig. 1, the head, with its shoe and insert, is shown just before it passes under the contact device when travelling in the direction of the associated arrow. When the carbon insert is new, the collector will pass under the contactor and will not effect any change in the relation of the parts thereof as shown in Fig. 2. It should be noted that contacts 13, 26 are out of engagement in this figure whereas in Fig. 2a these contacts are engaged. In the latter figure, the carbon insert is illustrated as having been worn down to a mere shell, thereby permitting the shoulders 30, 30 of the head 27 to make mechanical engagement with the runners 10, 10, thereby raising the latter and closing contacts 13, 26. Obviously, any type of signal for indicating the above outlined condition may be employed and so located as desired.

Figure 4:
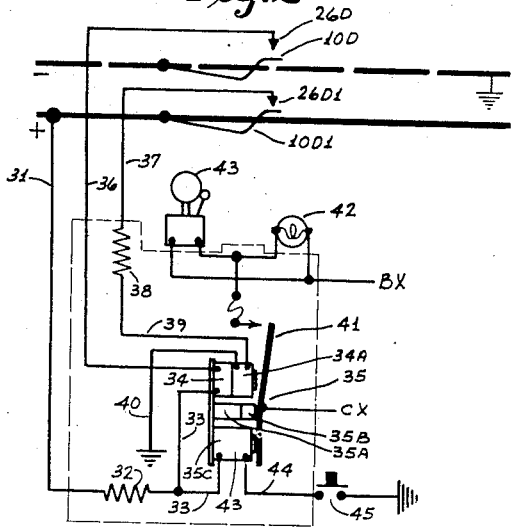
Figure 4 is a circuit diagram of a preferred type of signalling system that has proven commercially satisfactory when used with the contact device referred to in the preceding figures.
Figure 3:
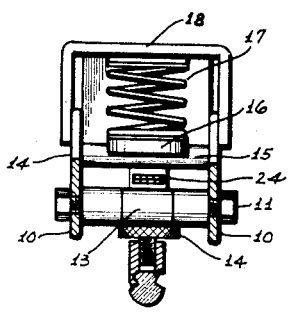
Figure 3 is a section along the vertical line, referred to in the description of Fig. 2, in the direction of the arrows associated with numerals 3, 3.

In Fig. 4, a diagrammatic representation of the circuit including the schematically illustrated contactor of the type shown in Fig. 1 installed on each trolley wire, it will be noted that provision is made for detecting the irregularities, referred to herein, when such occurs in either or both of the collectors. In this figure the polarized last position relay designated generally by numeral 35 consists of two independent windings 34, 34A mounted on a pole piece that is secured to magnetic yoke 35C, a second pole, also attached to the yoke, carries winding 43; armature 41 is pivotally mounted on magnetic cap 35B that is secured to permanent magnet 35A that is in turn secured to the yoke. Returning to the contactors, stationary contacts are designated by 26D, 26D1 and the runners 10D, 10D1. The circuit under control of contact 26D and runner 10D starts with the junction of wire 31 and the positive trolley wire, resistor 32, wire 33, winding 34 of the relay, wire 36 to the negative trolley wire, when the said contacts are closed. For the other contactor, the circuit proceeds from the positive wire through runner 10D1, contact 26D1, wire 37, resistor 38, wire 39 to the winding 34A, then to ground through wire 40. Thus, it will be seen that when either of the said runners is closed, armature 41 will be operated from the open state, as illustrated, and the contacts associated therewith closed, which closing establishes a circuit from another source of electrical energy, preferably 110 volts A. C. from wire BX through signal lamp 42 and also from BX to the audible signal bell 43. Positive wire 33 is also in circuit with winding 43, wire 44, push button 45 to negative or ground. The operation of this push button closes the contacts thereof and applies energy to said winding thereby restoring armature 41 to the position shown in the diagram and separating the contacts associated therewith, thereby opening the signal circuit which restores the apparatus to normal. The elements encompassed by the generally rectangular boundary, in the commercial embodiment of this invention, are assembled in a case as a unit to facilitate installation by the user.

With special reference to Figs. 2 and 2a, it will be noted that if the trolley pole head 27 of the collector if carried by a bent trolley pole, one of the shoulders of said head will engage one of the runners; likewise, if the supporting means for the pole or the head is out of alignment the same condition will prevail and a signal will be given to indicate the irregularity. It should also be noted that in the event the carbon block 29 is worn so as to have a groove other than straight the shoe will be likewise distorted and when this reaches a stage that becomes injurious the flange of shoe 28 will engage one of the runners and announce the condition by operating the signal, thus indicating attention is required. In some conditions, such as a defective or damaged carbon, whether due to faulty installation or to accident, such as may be occasioned by a "wild" trolley, the carbon block may crumble and be lost, whereupon the runners will be engaged by shoulders, close the contacts and announce the signal.

Manifestly, the invention, as illustrated and described, is susceptible of modification without departing from the inventive concept, and right is hereby reserved of such modifications as fall within the scope of the appended claims.

I claim:

1. In a signalling system, a circuit closing apparatus installed on a trolley wire that supplies current to an electrically propelled vehicle through its trolley head pivotally mounted on a trolley pole carried by said vehicle, said head having a carbon insert that traverses the wire; said apparatus comprising a spine attached to the trolley wire, a pair of normally separated electrical contacts mounted on said spine, a pair of swingable arms articulated to said spine and so disposed that these arms when swung to a predetermined degree will close the contacts and operate the signal; said arms also being so organized that they will be engaged by said head sufficiently to close said contacts only when at least one of the following conditions exist: wear on the carbon insert beyond a predetermined limit; mis-alignment of the carbon insert in terms of the head; mis-alignment of the trolley head in terms of the normal position; frozen head bearing; displacement of the shoe as a result of a dissymmetrically worn groove in the carbon insert.

2. In a signalling system, a circuit closing apparatus installed on a trolley wire that supplies current to an electrically propelled vehicle through its trolley shoe having a carbon insert that traverses the wire; said apparatus comprising a spine attached to the trolley wire, a pair of members depending from said spine for engagement with parts of the head or shoe, and so disposed that when said members engage either the head or the shoe the electric circuit will be closed and operate the signal; said members also being so organized that they will be engaged by said head or the shoe only when at least one of the following conditions exist: wear on the carbon insert beyond a predetermined limit; mis-alignment of the carbon insert in terms of the shoe; mis-alignment of the trolley shoe in terms of its normal position; loss of the carbon insert; frozen head bearing.

3. In a signalling system, a circuit closing apparatus installed on a trolley wire that supplies current to an electrically propelled vehicle through its trolley shoe having a carbon insert that traverses the wire; said apparatus comprising a spine attached to the trolley wire, a pair of members depending from said spine for engagement with parts of the head or shoe, and so disposed that when said members engage either the head or the shoe the electric circuit will be closed and operate the signal; said members also being so arranged and disposed in relation to said contacts that the latter will be closed only when said head or shoe traverses said members in an abnormal condition.

4. In a signalling system, a circuit closing apparatus installed on a trolley wire that supplies current to an electrically propelled vehicle through its trolley head having a shoe and a carbon block mounted therein that traverses the wire; said apparatus comprising a spine attached to the trolley wire, a pair of normally separated electrical contacts mounted on said spine, a pair of swingable arms articulated to said spine and so disposed that these arms when swung to a predetermined degree will close the contacts and operate the signal; said arms also being so arranged and disposed in relation to said contacts that the latter will be closed only when said head traverses said arms in an abnormal state.

5. In a signalling system, a circuit closing apparatus installed on a trolley wire that supplies current to an electrically propelled vehicle through its trolley head pivotally mounted on a trolley pole carried by said vehicle, said head having a carbon insert that traverses the wire; said apparatus comprising a spine mounted above and attached to the trolley wire, a pair of normally separated electrical contacts mounted on said spine, a pair of swingable arms disposed longitudinally of said trolley wire and articulated to said spine and so disposed that these arms when swung to a predetermined degree will close the contacts and operate the signal; said arms also being so organized that they will be engaged by said head sufficiently to close said contacts only when at least one of the following conditions exist; wear on the carbon insert beyond a predetermined limit; mis-alignment of the carbon insert in terms of the head; mis-alignment of the trolley head in terms of the normal position; frozen head bearing; displacement of the shoe as a result of a dissymmetrically worn groove in the carbon insert.

6. In a signalling system, a circuit closing apparatus installed on a trolley wire that supplies current to an electrically propelled vehicle through its trolley head having a shoe and a carbon block mounted therein that traverses the wire; said apparatus comprising a spine attached to the trolley wire, a pair of normally separated electrical contacts mounted on said spine, a pair of swingable arms disposed longitudinally of said trolley wire and articulated to said spine and so disposed that these arms when swung to a predetermined degree will close the contacts and operate the signal; said arms also being so arranged and disposed in relation to said contacts that the latter will be closed only when said head traverses said arms in an abnormal state.

7. In combination, a normally open contactor adapted to be mounted on a trolley wire and an indicating system provided with means to indicate when the contactor has been closed, the contactor being so constructed and arranged as to be electrically closed with respect to the trolley wire when engaged by a passing trolley head with a current collector which has worn a predetermined amount, the indicating system arranged for connection to the contactor and to the trolley wire circuit and provided with signal means, the indicating system being so constructed and so arranged as to energize the signal means when the contactor is closed as described above.

References Cited in the file of this patent

UNITED STATES PATENTS

| | | |
|---|---|---|
| 2,302,890 | Richterkessing | Nov. 24, 1942 |
| 2,408,553 | Gieskieng et al. | Oct. 1, 1946 |
| 2,574,474 | Gieskieng | Nov. 13, 1951 |
| 2,629,862 | Sawyer | Feb. 24, 1953 |